United States Patent
Porter (10) Patent No.: US 10,748,188 B2
(45) Date of Patent: *Aug. 18, 2020

(54) SYSTEM AND METHOD FOR DYNAMICALLY RETRIEVING AND MONITORING GEOFENCE ACTIVITY

(71) Applicant: SALESFORCE.COM, INC., San Francisco, CA (US)

(72) Inventor: David Porter, Indianapolis, IN (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,579

(22) Filed: Aug. 9, 2019

(65) Prior Publication Data

US 2019/0362385 A1    Nov. 28, 2019

Related U.S. Application Data

(63) Continuation of application No. 16/168,195, filed on Oct. 23, 2018, which is a continuation of application No. 15/996,782, filed on Jun. 4, 2018, now Pat. No. 10,380,638, which is a continuation of application No. 15/461,317, filed on Mar. 16, 2017, now Pat. No. 9,990,654, which is a continuation of application No. 15/182,380, filed on Jun. 14, 2016, now Pat. No. 9,633,370, which is a continuation of application No.
(Continued)

(51) Int. Cl.
*H04W 4/021* (2018.01)
*H04W 4/029* (2018.01)
*G06Q 30/02* (2012.01)
*H04W 68/00* (2009.01)
*G06Q 50/00* (2012.01)

(52) U.S. Cl.
CPC ..... *G06Q 30/0261* (2013.01); *G06Q 30/0259* (2013.01); *G06Q 30/0267* (2013.01); *G06Q 50/01* (2013.01); *H04W 4/021* (2013.01); *H04W 4/022* (2013.01); *H04W 4/029* (2018.02); *H04W 68/00* (2013.01)

(58) Field of Classification Search
CPC ..... H04W 4/021; H04W 4/022; H04W 4/028; H04W 4/029; H04W 68/00
See application file for complete search history.

(56) References Cited

U.S. PATENT DOCUMENTS

| | | |
|---|---|---|
| 2011/0287786 A1 | 11/2011 | Cassapakis |
| 2012/0309409 A1 | 12/2012 | Grosman |
| 2012/0310527 A1 | 12/2012 | Yariv |

(Continued)

*Primary Examiner* — Ted M Wang
(74) *Attorney, Agent, or Firm* — Morris & Kamlay LLP (57) ABSTRACT

Systems, device and techniques are disclosed for dynamically retrieving and monitoring geo-fence activity. A meta geo-fence may be identified based on a user device geolocation. The meta geo-fence having a radius that is dynamically generated to include previously defined geo-fences within or touching the meta geo-fence. User device geolocation may be monitored in relation to the defined geofences included in the radius of the meta geo-fence. A communication may be sent to the user device when the user device reports that the user device has entered or exited one of the previously defined geo-fences within or touching the radius of the meta geo-fence.

18 Claims, 5 Drawing Sheets

Related U.S. Application Data

14/488,945, filed on Sep. 17, 2014, now Pat. No. 9,398,409.

(60) Provisional application No. 61/878,752, filed on Sep. 17, 2013.

(56) References Cited

U.S. PATENT DOCUMENTS

| | | |
|---|---|---|
| 2012/0317615 A1 | 12/2012 | Geva |
| 2013/0045760 A1 | 2/2013 | Obermeyer |
| 2013/0073393 A1* | 3/2013 | Nasr ............... H04L 12/66 705/14.58 |
| 2013/0225196 A1* | 8/2013 | James ............... H04W 4/029 455/456.1 |
| 2013/0324166 A1 | 12/2013 | Mian |
| 2014/0222570 A1 | 8/2014 | Devolites |
| 2015/0148061 A1* | 5/2015 | Koukoumidis ....... H04W 4/022 455/456.1 |

* cited by examiner

SYSTEM AND METHOD FOR DYNAMICALLY RETRIEVING AND MONITORING GEOFENCE ACTIVITY

PRIORITY

This application is continuation of Ser. No. 16/168,195, entitled, "SYSTEM AND METHOD FOR DYNAMICALLY RETRIEVING AND MONITORING GEOFENCE ACTIVITY" filed on Aug. 9, 2019, now U.S. Pat. No. 10,445,780, which is a continuation of Ser. No. 15/996,782, filed on Jun. 4, 2018, now U.S. Pat. No. 10,380,638, which is a continuation of Ser. No. 15/461,317, filed on Mar. 16, 2017, now U.S. Pat. No. 9,990,654, which is a continuation of U.S. patent Ser. No. 15/182,380, filed Jun. 14, 2016, now U.S. Pat. No. 9,633,370, which is a continuation of U.S. patent Ser. No. 14/488,945, filed Sep. 17, 2014, now U.S. Pat. No. 9,398,409, which claims benefit of U.S. Provisional Application No. 61/878,752 filed Sep. 17, 2013, the disclosures of which are incorporated by reference herein in their entirety.

BACKGROUND

A Communication Service Provider may enable its customers to design and execute marketing campaigns. A marketing campaign may include communications designed by a client and sent by a Communication Service Provider on a schedule or due to a triggered event. Geo-fencing may allow for the execution of marketing campaign activities, such as the sending of communications, in the event that a user is determined to reside within a geographic location.

A Communication Service Provider may setup certain geo-fences for its clients. This may allow the Communication Service Provider to be notified in the event a user crosses between boundaries of any defined geo-fences. A geo-fence may be a location of interest defined by a latitude, longitude, and radius. In the event that a cell phone is configured to monitor geo-fence activity, crossing the boundary defined by the radius extending from a geographic point defined by a latitude and longitude may cause the cell phone to generate a geo-fence entrance report. Similarly, if the same cell phone thereafter moves outside of the radius from the geographic point, a geo-fence exit report may be generated. For example, a user carrying his or her cell phone may walk into a coffee shop which reports to a Communication Service Provider that a geo-fence for the coffee shop has been crossed by the user. After receiving this indication, the Communication Service Provider may send a coupon to the user for the coffee shop through execution of a marketing campaign designed by the coffee shop.

A user's device may need to have knowledge of each geo-fence in order to generate reports to a Communication Service Provider that a geo-fence has been entered or exited. It would be inefficient to download the totality of geo-fences known by a Communication Service Provider to a user device because the Communication Service Provider may have defined geo-fences for many of its clients in many different cities, some of which may not be relevant to the user. For example, a user in Dallas, Tex. may not be interested in downloading and reporting on geo-fence boundary crossings for retail stores, service providers, restaurants, and other locations in Chicago, Ill.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Techniques disclosed herein enable a user device to generate a meta geo-fence of dynamic size based upon adjacent geo-fences. The meta geo-fence may provide a boundary for the generation and monitoring of geo-fences which fall within or touch the meta geo-fence. The techniques include a system that seeks to monitor a user device in relation to a meta geo-fence and send a communication to the user device when the user device enters or exits a previously defined geo-fence. A geo-fence may be a location of interest defined by a latitude, longitude, and radius. The techniques disclosed herein enhance geo-fencing by allowing for communications to be sent based on geo-fences without requiring that a user device store information on all geo-fences set up by a Communication Service Provider. This may allow the Communication Server Provider to reach a large number of user devices, while requiring the usage of less storage space on the user devices.

The techniques disclosed herein enable a Communication Service Provider to send communication to a user device based on a meta geo-fence. Using a meta geo-fence may enable the use of fewer storage and computational resources on a user device. As a specific example, a Communications Service Provider may setup five geo-fences. Using the techniques disclosed herein, the number of geo-fences a user device may need to store and monitor may be reduce to three geo-fences that are within a meta geo-fence. The reduction may result in processing and storage saving, and a reduction in bandwidth usage between the Communication Service Provider and the user device.

Figure 1:
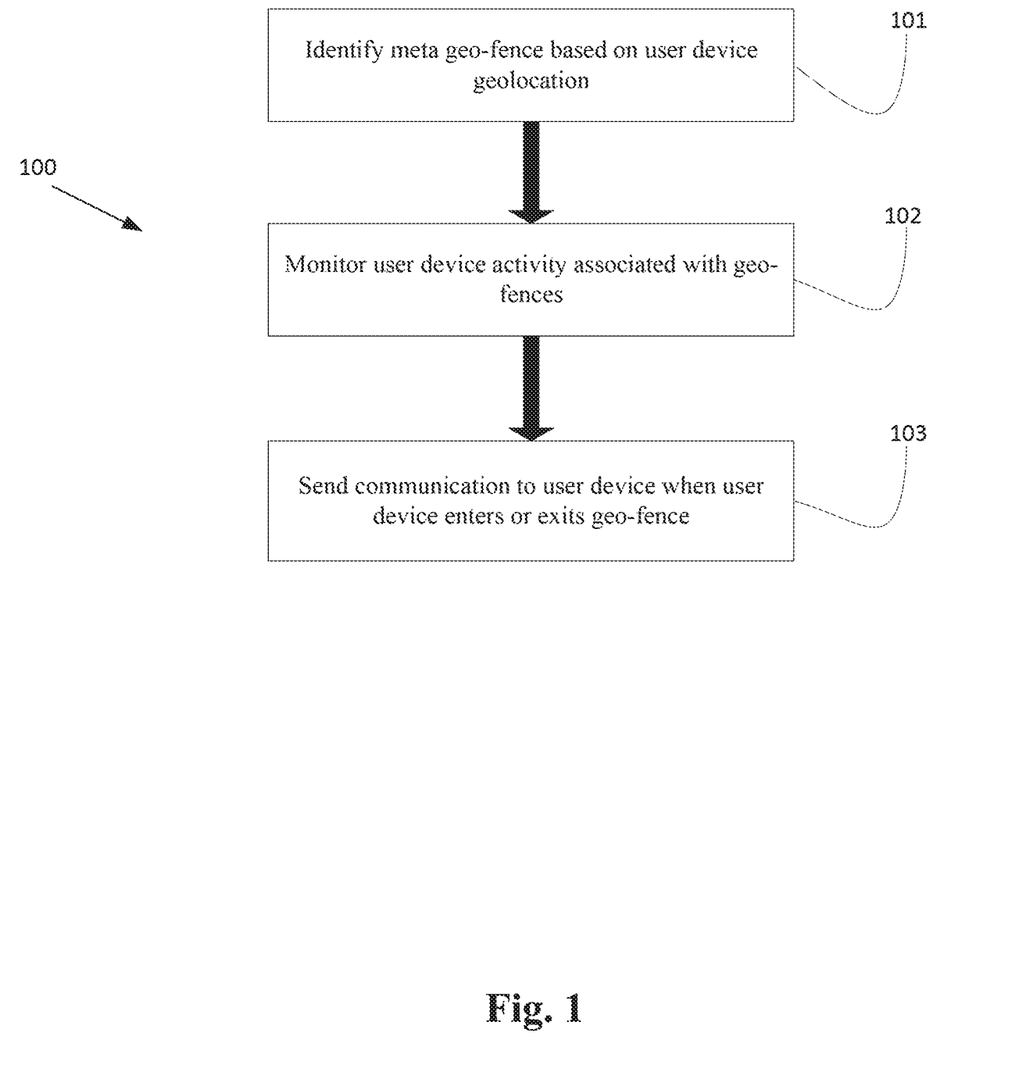
FIG. 1 shows an example process for dynamically retrieving and monitoring geo-fence activity, according to an implementation of the disclosed subject matter.

According to implementations of the disclosed subject matter, as shown in FIG. 1, the activity of a user device may be monitored in relation to a meta geo-fence and a communication may be sent to the user device when the user device enters or exits geo-fences, as shown by the flowchart 100. As shown at step 101, a meta geo-fence may be identified based on a user device geolocation. At step 102, user device activity associated with one or more previously defined geo-fences may be monitored. At step 103, a communication may be sent to the user device when the user device enters or exits one of the previously defined geo-fences.

According to one implementation of the disclosed subject matter, a meta geo-fence may be identified based on a user device geolocation at step 101. The user device geolocation may be used by the Communication Service Provider to identify geo-fences nearby the geolocation of the user device. A meta geo-fence may be generated based on the identity and properties of the geo-fences near to the user device geolocation. The radius of the meta geo-fence may be generated to encompass or touch a number of geo-fences, subject to a maximum radius. The meta geo-fence may include a radius that will encompass or touch a number of the nearest geo-fences based on the geographical distance between the user device and the center point of a geo-fence minus the radius of the geo-fence.

For example, the Communication Service provider may have setup multiple geo-fences, A, B, C, D, and E. The meta geo-fence may be may be generated to assist in monitoring the entrance and exit of the user device from the geo-fences A, B, C, D, and E. The meta geo-fence may be generated, based on the user device geolocation, to touch the geo-fences A, B, and C, as the user device geolocation may indicate that the user device is not near geo-fences D and E. The meta geo-fence may include a radius that will encompass or touch the geo-fences A, B, and C. In the event that the user device is moved to a location further away from the geo-fences A, B, and C, the meta geo-fence may be change in radius to ensure that at least a pre-defined number, for example, three, geo-fences are within or touching the meta geo-fence.

According to one implementation of the disclosed subject matter a user device activity associated with one or more previously defined geo-fences may be monitored at step 102. The user device, which may be, for example, a smartphone, may monitor the geolocation of the user device with respect to the previously defined geo-fences. The user device may send a report to the Communication Service Provider when the user device detects, based on geolocation services, that the user device has entered or exited one of the previously defined geo-fences. The user device may monitor its own geolocation and compare the geolocation to the geo-fences that are encompassed within or touched by the meta geo-fence. The user device may not monitor whether the user device has entered or exited a geo-fence if the geo-fence is not encompassed within or touched by the meta geo-fence.

For example, the Communication Service Provider may define geo-fences A, B, C, D, and E. A meta geo-fence may be generated that encompasses or touches the geo-fences A, B, and C. The user device may monitor the geolocation of the user device with respect the geo-fences A, B, and C, encompassed within or touched by the meta geo-fence, and not with respect to geo-fences D and E. The user device may send a report to the Communication Service Provider when the user device enters or exits one of the geo-fences A, B, or C, that are encompassed within or touched by the meta geo-fence. The user device may not compare the geolocation of the user device to the geo-fences D and E, as the meta geo-fence may not encompass or touch the geo-fences D and E.

According to one implementation of the disclosed subject matter, a communication may be sent to the user device when the user device enters or exits one of the previously defined geo-fences at step 103. The user device may report to the Communication Service Provider when the user device enters or exits a geo-fence that is encompassed within or touched by the meta geo-fence. The Communication Service Provider may send a communication, such as an email, SMS, MMS, or other electronic communication, to the user device. The communication may be sent to a user device that is entering a geo-fence, exiting a geo-fence, or both, and may be specific to a marketing campaign for an entity related to the area within the geo-fence.

For example, the meta geo-fence may encompass or touch the geo-fences A, B, and C. The geo-fence A may encircle a restaurant. In the event that the user device reports that the user device has entered the geo-fence associated with the restaurant, the Communication Service Provider may send a communication, such as an email, to the user device. The email may be part of a marketing campaign for the restaurant, and may include, for example, coupons or offers for the restaurant.

Figure 2A:
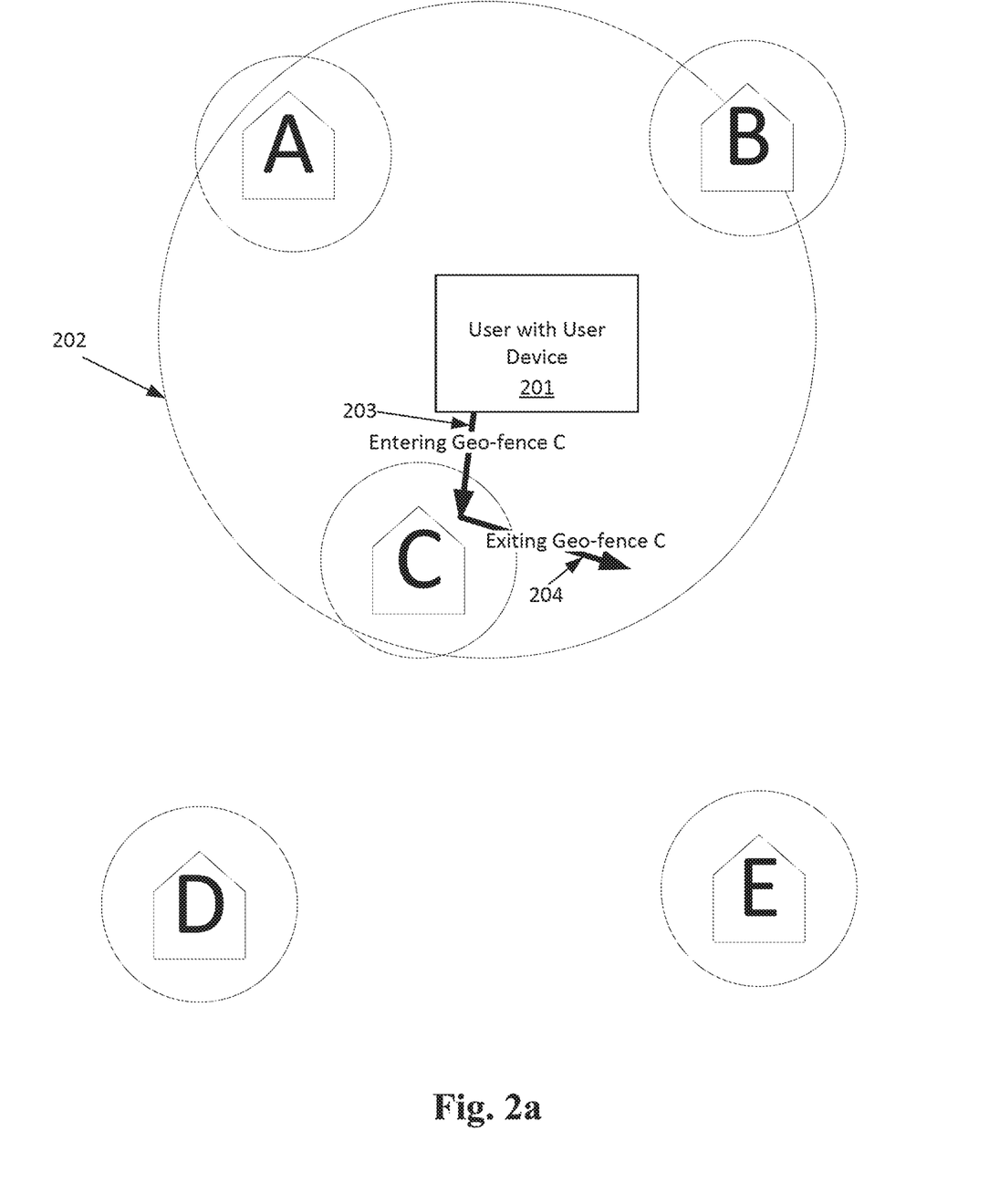
FIGS. 2A and 2B show example meta geo-fences according to an implementation of the disclosed subject matter.
Figure 2B:
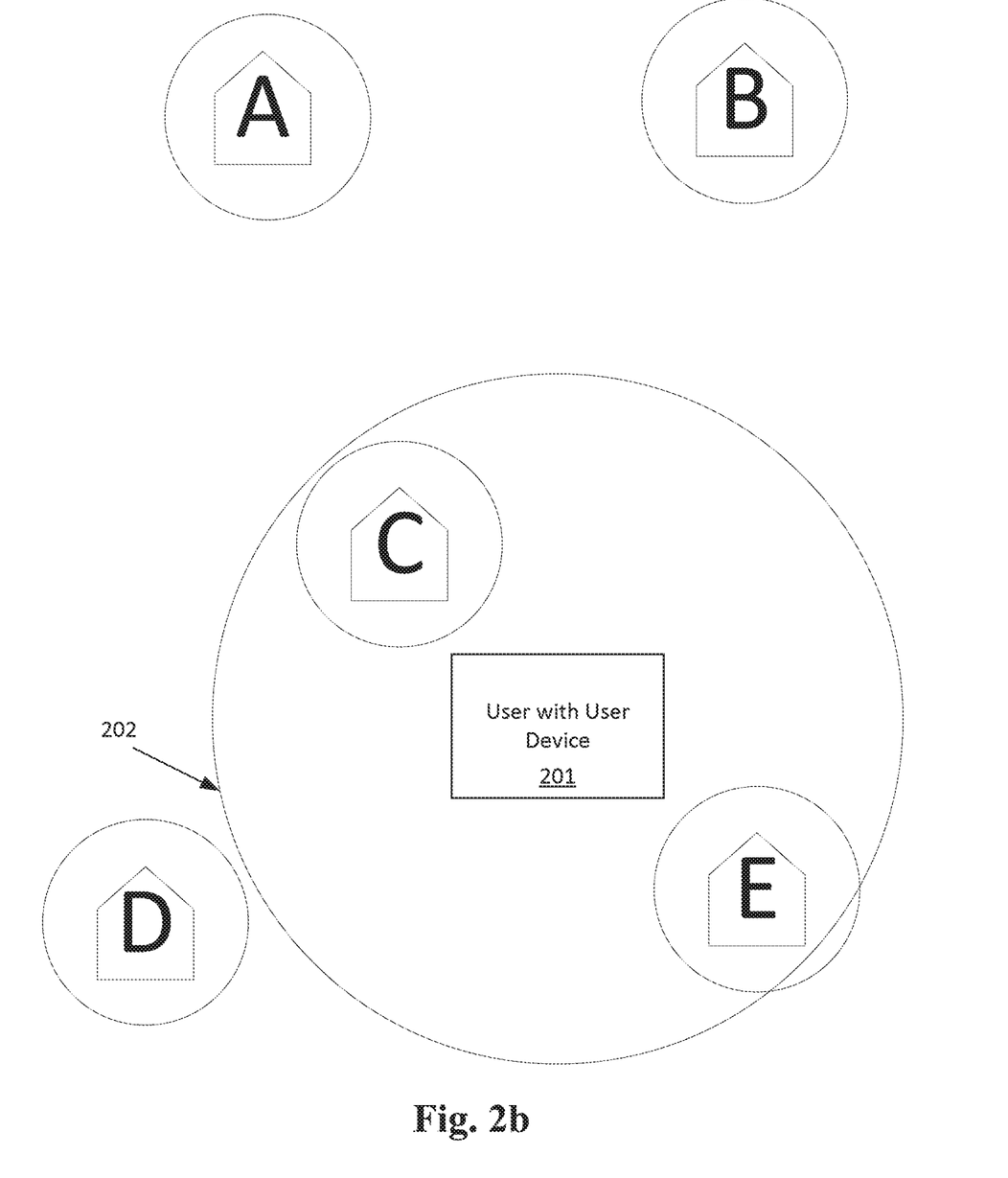

FIGS. 2A and 2B show example meta geo-fences. A user 101 may be positioned at a geographic location with proximity to five previously setup geo-fences, A, B, C, D and E, which may be at some distance from the user 201. The user 201 may be carrying a device capable of tracking geolocation in any suitable manner, such as, for example, a cell phone, smartphone, tablet, laptop, or other computing device. A Communications Service Provider may provide marketing campaign design and delivery for clients with the geo-fences A, B, C, D, and E. The geo-fences may surround a retail shop, restaurant, point of interest, or any geographic area. The geo-fences may have any shape and size, and may be, for example, circular and have a center and a radius. When a user device, carried with the user 201, for example, and equipped with geolocation services, passes through any of the geo-fences A, B, C, D, and E, the user device may send a report to the Communication Service Provider that a geo-fence has been entered. Similarly, when the user device exits any of the geo-fences A, B, C, D, and E, the user device may send a report to the Communication Service Provider that a geo-fence has been exited.

The Communication Service Provider may have setup multiple geo-fences, for example, geo-fences A, B, C, D, and E. It may be inefficient to require a user device to monitor whether any of the geo-fences have been entered or exited. For example, the user 201 may be far away from the geo-fence, which may make it unlikely that the user would enter the geo-fence D in the near future. A meta geo-fence 202 may be generated to allow for more efficient monitoring of whether a user device has entered or exited a previously setup geo-fence, such as the geo-fences A, B, C, D and E. The meta geo-fence 202 may provide a context to the user device of the user 201 such that only geo-fences which are within or come in contact with the meta geo-fence 202 are actively monitored. The meta geo-fence 202 may touch or encompass the geo-fences A, B, and C, as illustrated in FIG. 2a. When the user, with the user device 201, enters or exits any of the geo-fences A, B, and C, then the user device may send a report to the Communications Service Provider that the corresponding geo-fence has been entered or exited. For example, the user may move with the user device 201 along the path 203, entering the geo-fence C. The user device 201 may send a report to the Communication Service Provider that the user device 201 has entered the geo-fence C. The user may then move with the user device 201 along the path 204, exiting the geo-fence C, and the user device 201 may send a report to the Communication Service Provider that the user device 201 has exited the geo-fence C.

A radius of the meta geo-fence 202 may be dynamically generated to encompass or touch a number of geo-fences subject to a maximum radius. The meta geo-fence 202 may include a radius that will encompass or touch a number of the nearest geo-fences based on the geographical distance between the user device and the center point of a geo-fence minus the radius of the geo-fence. The meta geo-fence 202, may, for example, increase from a radius of 2000 m to a radius of 4000 m when the user 201, with the user device, moves to an area where the nearest geo-fences C, D, and E are further apart. The number of geo-fences that may be used to set the radius of the meta geo-fence 202 may be set to three.

In the event that the user 201, with the user device, moves to a location further away from the geo-fences A, B, C, D, and E, the radius of the meta geo-fence 202 may be changed to ensure that at least a pre-set number, for example, three, of the geo-fences are within or touching the meta geo-fence 202. A maximum radius may be set for the meta geo-fence 202. For example, a maximum radius of 10,000 m may be set for the meta geo-fence 202. The meta-geo fence 202 may also be set to ensure that at least three geo-fences are within or touching the meta geo-fence 202. If the user 201, with the user device, is at a geolocation where the center point of only two geo-fences are within 10,000 m, then the meta geo-fence 202 may be generated with a radius of the maximum 10,000 m and may only encompass or touch two of the geo-fences, as shown in FIG. 2b.

A meta geo-fence, such as the meta geo-fence 202, may assist in establishing a scope for which geo-fence locations and radiuses are to be acquired and actively monitored, for example, by a user device. The geo-fence locations and radiuses may be acquired by downloading, referencing an online database, or making an API call to a third party service. A meta geo-fence may provide a boundary where only geo-fences residing within or touching the meta geo-fence may be actively monitored by a user device. For example, a user device with a geolocation of a baseball stadium in Chicago may identify a meta geo-fence with a radius of one mile. The user device may download, for example, from the Communication Service Provider, and actively monitor previously setup geo-fences that are within a one mile radius of the baseball stadium. The user device may not download or actively monitor any geo-fence that is outside of the one mile radius from the baseball stadium. If there is a geo-fence with a one hundred foot radius around a restaurant which is less than one mile from the baseball stadium, the user device may be aware of the geo-fence, monitor the location of the user device relative to the geo-fence, and send a report to the Communication Service Provider in the event that the user device enters or exits the geo-fence corresponding to the restaurant.

A user device, for example, carried by the user 201, may send a report to the Communication Service Provider when exiting or entering a geo-fence. The Communication Service Provider may send a communication, for example, an electronic communication such as an email, which may be part of a marketing campaign for the client for whom the geo-fence was setup. The Communication Service Provider may store activity associated with a user device entering or exiting a geo-fence. The communication may include one or more of, for example, an email, SMS, MMS, Facebook message, LinkedIn message, tweet, social networking system message, a push notification through an operating system of a mobile device, or other communication able to be retrieved by a user device.

A client of a Communication Service Provider may be able to, through a graphical user interface, create, modify, and manage geo-fences associated with campaigns conducted by the Communication Service Provider for the client. For example, the Communication Service Provider may provide a graphical user interface to clients as a software-as-a-service product over the Internet.

Figure 3:
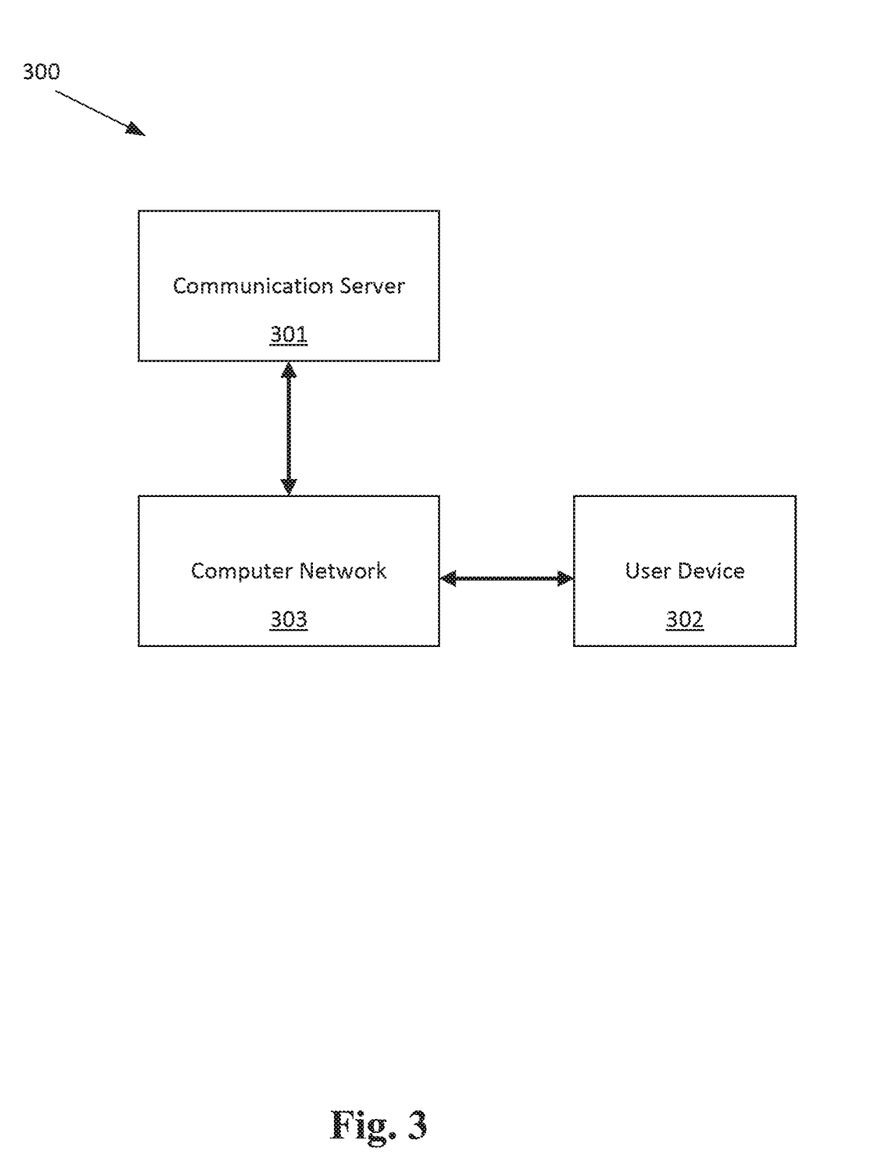
FIG. 3 shows an example system for meta geo-fences according to an implementation of the disclosed subject matter.

FIG. 3 shows an example system for meta geo-fences according to an implementation of the disclosed subject matter. A system 300 may include a communication server 301, a user device 302, and a computer network 303. Only one user device 302 is depicted in FIG. 3, although the system 300 may have more than one user device 302 operating at the same time.

The communication server 301 may be configured to dynamically generate a meta geo-fence, such as the meta geo-fence 202, based on a geolocation of the user device 302 and previously setup geo-fences. The communication server 301 may be, for example, a server of a Communications Service Provider. The communications server 301 may include any suitable software, hardware, and componentry, such as, for example, microprocessors, memory systems, input/output devices, device controllers and display systems. The communications server 301 may be a single server, or may be number of servers or other computing devise interconnected by suitable hardware and software systems and which collectively can perform any suitable functions of the communications server 301.

Each component in the system 300 may communicate with other electronically coupled components through the network 303. The network 303 may include, for example, the Internet, a WAN, LAN, private network, public network, or any other type of computer network. The communication between any component and another computing device may be bidirectional. The user device 301 may include any type of device capable of receiving a communication from an enterprise or retrieving a communication stored within a service provider where a communication is sent, such as, for example, a smartphone, PDA, tablet, gaming system, personal computer, laptop, and cell phone.

Figure 4:
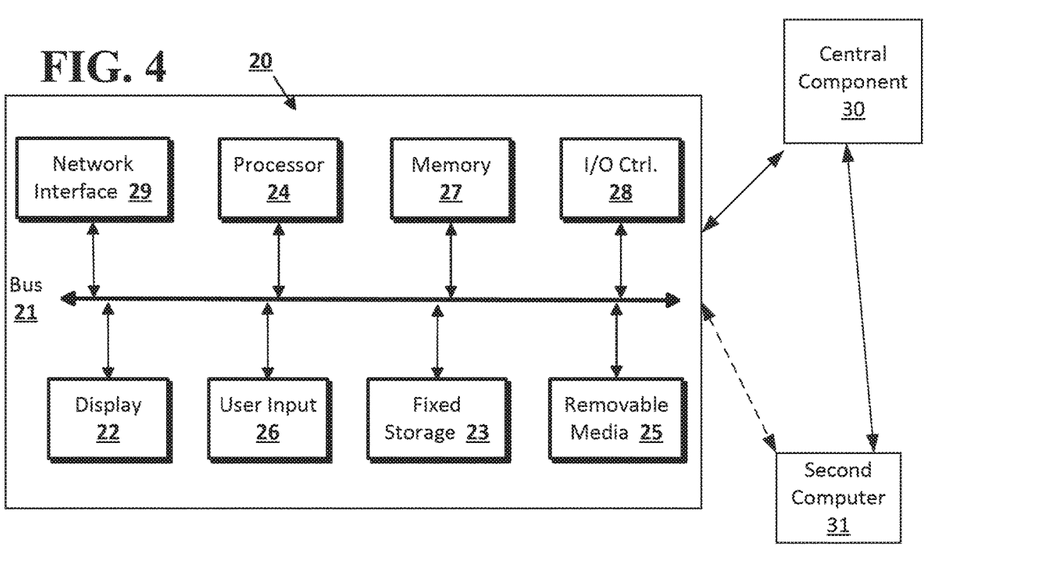
FIG. 4 shows a computer according to an implementation of the disclosed subject matter.

Implementations of the presently disclosed subject matter may be implemented in and used with a variety of component and network architectures. FIG. 4 is an example computer 20 suitable for implementing implementations of the presently disclosed subject matter. As discussed in further detail herein, the computer 20 may be a single computer in a network of multiple computers. As shown in FIG. 4, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
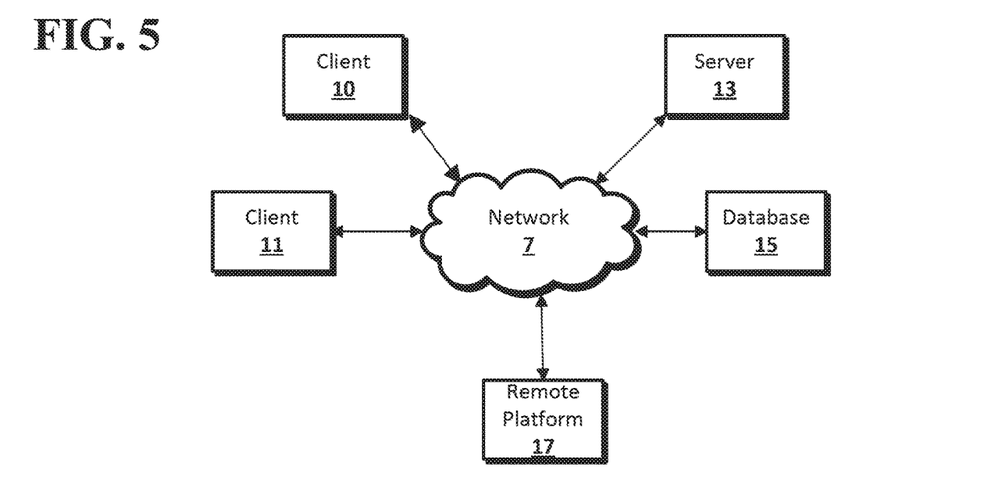
FIG. 5 shows a network configuration according to an implementation of the disclosed subject matter.

FIG. 5 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method for dynamically monitoring geo-fences comprising:
    identifying a meta geo-fence based on a user device geolocation, the meta geo-fence having a radius that is dynamically generated to include at least a pre-set number of one or more previously defined geo-fences within or touching the meta geo-fence, wherein the pre-set number is greater than zero;
    monitoring user device geolocation in relation to the one or more previously defined geo-fences included in the radius of the meta geo-fence; and
    sending a communication to the user device when the user device reports that the user device has entered or exited one of the one or more previously defined geo-fences within or touching the radius of the meta geo-fence.

2. The computer-implemented method of claim 1, wherein monitoring user device activity further comprises listening for a report from the user device, the report indicating that the user device has entered or exited one of the one or more previously defined geo-fences included in the radius of the meta geo-fence.

3. The computer-implemented method of claim 1, wherein the communication is one of an email, an SMS, an MMS, a push notification, and a social networking system message.

4. The computer-implemented method of claim 1, wherein the communication is a marketing communication for a marketing campaign.

5. The computer-implemented method of claim 1, further comprising:
   determining that the user device has moved based on a new geolocation of the user device and that at least one of the previously defined geo-fences is no longer within or touching the radius of the meta geo-fence;
   changing the radius of the meta geo-fence so that at least one of the previously defined geo-fences or another previously defined geo-fence is within or touching the radius of the meta geo-fence.

6. The computer-implemented method of claim 1, sending the user device the previously defined geo-fences that are within or touching the meta geo-fence and not sending the user device previously defined geo-fences that are not within or touching the meta geo-fence.

7. The computer-implemented method of claim 1, wherein the meta geo-fence includes a maximum radius, and wherein the meta geo-fence is not updated to have a radius greater than the maximum radius.

8. A computer-implemented method for dynamically monitoring geo-fences comprising:
   receiving a meta geo-fence at a user device, the meta geo-fence comprising a radius and geolocation for the center of the meta geo-fence, wherein the radius of the meta geo-fence is dynamically generated to include at least a pre-set number of one or more previously defined geo-fences within or touching the meta geo-fence, wherein the pre-set number is greater than zero;
   receiving at least one geo-fence, the geo-fence comprising a radius and a geolocation, wherein the geo-fence is encompassed within or touching the radius of the meta geo-fence;
   monitoring of a geolocation of the user device; and
   sending by the user device an entrance report or an exit report if the geolocation of the user device indicates that the user device is entering or exiting the at least one geo-fence that is within or touching the meta geo-fence.

9. The computer-implemented method of claim 8, further comprising receiving at the user device at least one geo-fence that is within or touching the meta geo-fence, and not receiving at the user device a geo-fence that is not within or touching the meta geo-fence.

10. The computer-implemented method of claim 8, further comprising determining by the user device if the geolocation of the user device indicates that the user device is entering or exiting a geo-fence only if the geo-fence is within or touching the meta geo-fence.

11. The computer-implemented method of claim 8, further comprising receiving at the user device an updated radius for the meta geo-fence.

12. The computer-implemented method of claim 8, further comprising receiving at the user device a second meta geo-fence to be used in place of the meta geo-fence.

13. The computer-implemented method of claim 8, further comprising receiving at the user device an electronic communication related to the at least one geo-fence that is within or touching the meta geo-fence.

14. A system for dynamically monitoring geo-fences, the system comprising:
   a user device configured to track a geolocation; and
   a communication server configured to dynamically generate a meta geo-fence based at least in part on the geolocation and one or more previously defined geo-fences within or touching the meta geo-fence, wherein the communication server is further configured to dynamically update the meta geo-fence by changing a radius of the meta geo-fence.

15. The system of claim 14, wherein the communication server is further configured to receive a report from the user device indicating that the user device has entered or exited one of the previously defined geo-fences within or touching the meta geo-fence.

16. The system of claim 14, wherein the user device is further configured to monitor the geolocation of the user device and send a report to the communication server when the user device enters or exits one of the previously defined geo-fences within or touching the meta geo-fence.

17. The system of claim 15, wherein the communication server is further configured to send an electronic communication to the user device, the electronic communication corresponding to the one of the previously defined geo-fences based on the report from the user device.

18. The system of claim 14, wherein the user device is further configured to download and monitor only the previously defined geo-fences that are within or touching the meta geo-fence.

* * * * *